(12) United States Patent
Yu

(10) Patent No.: US 12,730,349 B2
(45) Date of Patent: Sep. 8, 2026

(54) LASER SCANNING DEVICE, PROJECTING SYSTEM, AND TIME-OF-FLIGHT DEVICE

(71) Applicant: Rayprus Technology (Foshan) Co., Ltd., Foshan (CN)

(72) Inventor: Hsiang-Chieh Yu, NewTaipei (TW)

(73) Assignee: Rayprus Technology (Foshan) Co., Ltd., Foshan (CN)

( * ) Notice: Subject to any disclaimer, the term of this patent is extended or adjusted under 35 U.S.C. 154(b) by 245 days.

(21) Appl. No.: 18/392,104

(22) Filed: Dec. 21, 2023

(65) Prior Publication Data

US 2024/0295791 A1 Sep. 5, 2024

(30) Foreign Application Priority Data

Mar. 2, 2023 (CN) ......................... 202310194415.3

(51) Int. Cl.

| | |
|---|---|
| ***G02F 1/29*** | (2006.01) |
| ***G01S 7/481*** | (2006.01) |
| ***G03B 21/20*** | (2006.01) |

(52) U.S. Cl.

CPC .............. *G02F 1/29* (2013.01); *G01S 7/4817* (2013.01); *G03B 21/2033* (2013.01); *G03B 21/2066* (2013.01); *G02F 2201/34* (2013.01); *G02F 2203/24* (2013.01)

(58) Field of Classification Search

CPC ........ G02B 26/10; G02B 26/08; G02B 27/12; G02B 5/124; G02F 1/29; G02F 2201/34; G02F 2203/24; G01S 7/4817; G01S 7/48; G03B 21/2033; G03B 21/2066

See application file for complete search history.

(56) References Cited

U.S. PATENT DOCUMENTS

| | | | | |
|---|---|---|---|---|
| 4,530,080 A * | 7/1985 | Aoi | ...................... | G11B 7/0055 |
| 2004/0125374 A1* | 7/2004 | Berger | ...................... | G01J 3/18 356/364 |
| 2008/0114531 A1* | 5/2008 | Kagawa | ................. | G08G 1/163 701/119 |
| 2016/0370618 A1* | 12/2016 | Shibano | ............ | G02F 1/136204 |

FOREIGN PATENT DOCUMENTS

| | | | |
|---|---|---|---|
| CN | 105807421 A * | 7/2016 | ......... G02B 26/0833 |
| CN | 206833058 U * | 1/2018 | |
| CN | 109164464 A | 1/2019 | |

(Continued)

*Primary Examiner* — Stephone B Allen
*Assistant Examiner* — Tamara Y. Washington
(74) *Attorney, Agent, or Firm* — ScienBiziP, P.C.

(57) ABSTRACT

A laser scanning device includes a laser device, a collimating lens, a scanning mirror, a telecentric lens, and a negative lens. The laser device emits a source light. The collimating lens is used to receive the source light and emits a first parallel light. The scanning mirror is used to receive the first parallel light and change a transmission direction of the first parallel light to emit a deflection light. The telecentric lens is used to receive the deflection light and deflect the deflection light into a second parallel light which is parallel to an optical axis of the telecentric lens. The negative lens is used to receive the second parallel light and emit a scanning light by changing a transmission direction of the second parallel light. A projecting system and a time of flight device are further disclosed.

17 Claims, 7 Drawing Sheets

(56) References Cited

FOREIGN PATENT DOCUMENTS

| | | | | | |
|---|---|---|---|---|---|
| CN | 216209859 | U | | 4/2022 | |
| CN | 115079410 | A | * | 9/2022 | ......... G02B 27/0101 |
| CN | 218497142 | U | | 2/2023 | |
| JP | H05217197 | A | * | 8/1993 | |
| JP | 2007178169 | A | * | 7/2007 | |
| WO | WO-2021199487 | A1 | * | 10/2021 | ............. G11B 7/139 |

* cited by examiner

LASER SCANNING DEVICE, PROJECTING SYSTEM, AND TIME-OF-FLIGHT DEVICE

FIELD

The subject matter herein relates to laser scanning devices, projecting systems, and time-of-flight devices.

BACKGROUND

Existing laser scanning device usually include a laser source, a collimating lens and a scanning galvanometer. The collimating lens collimates scanning light emitted by the laser source and then irradiates the light onto the galvo scanning system, and the scanning galvo scanning system deflects the light to control the scanning light to be emitted at different angles. However, limited by high frequency and structure of the galvo scanning system, a scanning range of the laser scanning device is usually limited, and the scanning light at an edge of the scanning range is affected by aberration, a collimation and an energy distribution of the laser will change. As a result, a complex lens surface needs to be set on the collimating lens to optimize the aberration. Such a complex lens surface not only increases the complexity of the optical system, but also increases the design cost.

Therefore, there is room for improvement within the art.

BRIEF DESCRIPTION OF THE DRAWINGS

Implementations of the present disclosure will now be described, by way of embodiment, with reference to the attached figures, wherein.

DETAILED DESCRIPTION

Figure 1:
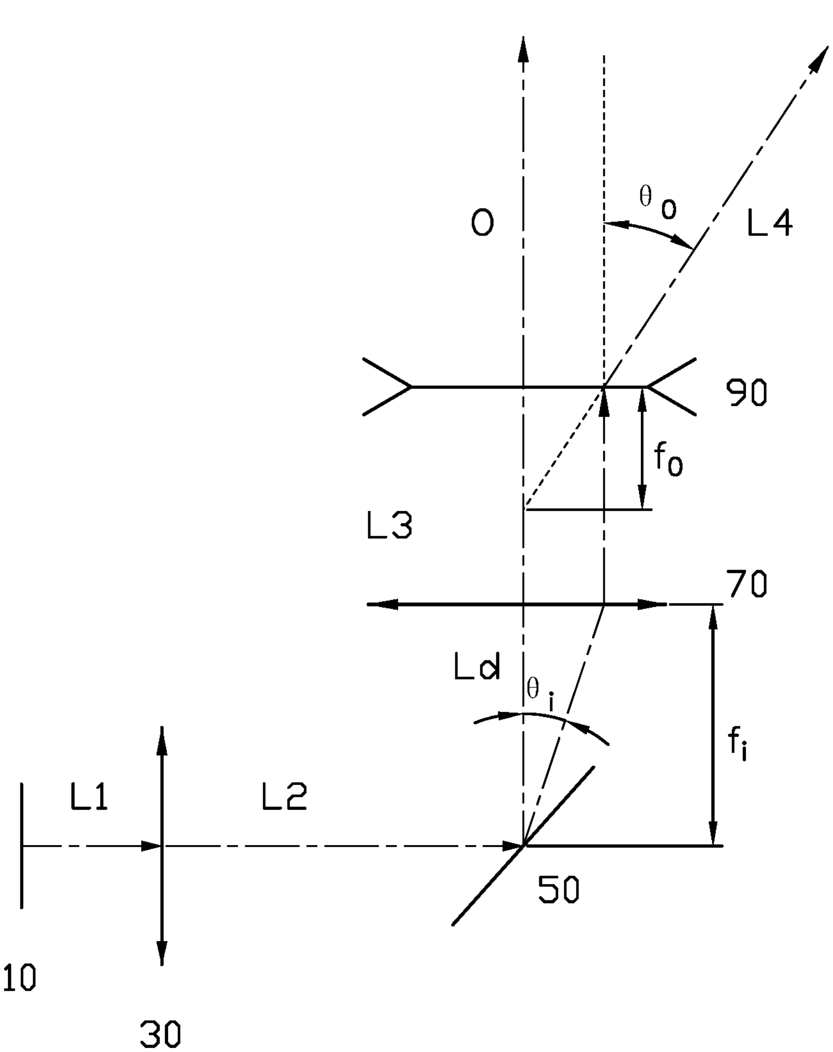
FIG. 1 is a schematic view of a laser scanning device according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

"Optional" or "optionally" means that the subsequently described circumstance may or may not occur, so that the description includes instances where the circumstance occurs and instances where it does not.

"Above" means one layer is located on top of another layer. In one example, it means one layer is situated directly on top of another layer. In another example, it means one layer is situated over the second layer with more layers or spacers in between.

When a feature or element is herein referred to as being "on" another feature or element, it can be directly on the other feature or element or intervening features and/or elements may also be present. It will also be understood that, when a feature or element is referred to as being "connected", "attached" or "coupled" to another feature or element, it can be directly connected, attached or coupled to the other feature or element or intervening features or elements may be present.

FIG. 1 illustrates a laser scanning device 100 according to a first embodiment of the present disclosure. The laser scanning device 100 is used to emit a scanning light with different transmission directions. The laser scanning device 100 can be applied to a laser scanning system with different distance, viewing angle and analytical requirements, such as micro projector, head-up display, time-of-flight (ToF) imaging device. The laser scanning device 100 includes a laser device 10, a collimating lens 30, a scanning mirror 50, a telecentric lens 70, and a negative lens 90. The laser device 10 emits a source light L1. The collimating lens 30 is configured to receive the source light L1 emitted by the laser device 10, and emit a first parallel light L2. The scanning mirror 50 is configured to receive the first parallel light L2, and change a transmission direction of the first parallel light L2 to emit a deflection light Ld. The telecentric lens 70 is configured to receive the deflection light Ld emitted by the scanning mirror 50, and deflect the deflection light Ld incident in a different directions to a second parallel light L3 parallel to an optical axis O of the telecentric lens 70. The negative lens 90 is configured to receive the second parallel light L3, and change a transmission direction of the second parallel light L3 to emit a scanning light L4.

Figure 2:
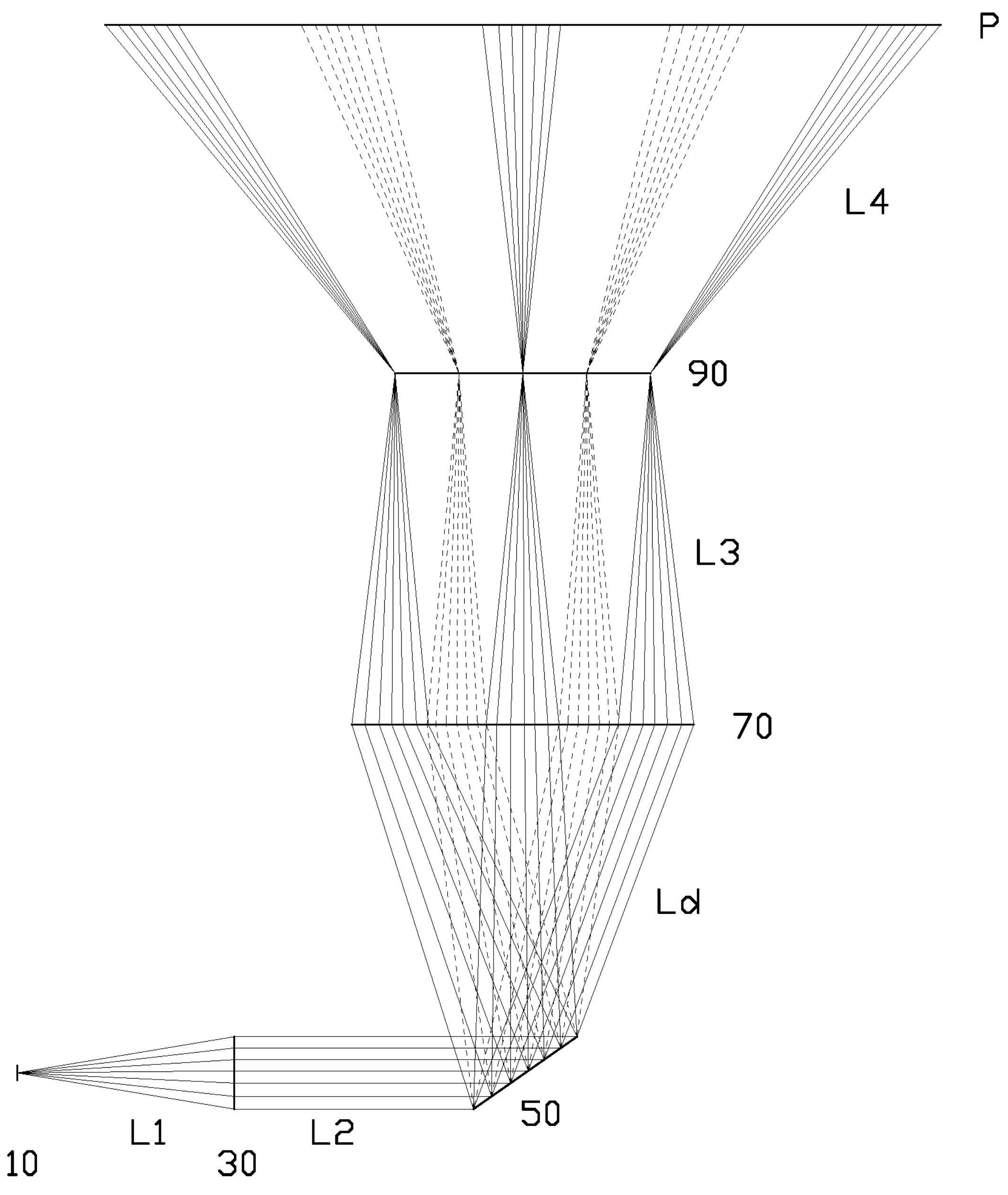
FIG. 2 is a schematic view of an optical path of a laser scanning device according to another embodiment of the present disclosure.

FIG. 2 illustrates an optical path of the laser scanning device 100 according to the first embodiment of the present disclosure. The source light L1 emitted from the laser device 100 is a light travels in multiple directions. The source light L1 becomes the first parallel light L2 by passing through the collimating lens 30. The first parallel light L2 is parallel to an optical axis of the collimating lens 30. The first parallel light L2 incident on the scanning mirror 50, and becomes the deflected light Ld after modulation of the scanning mirror 50. The scanning mirror 50 emits the deflected light Ld at an emission angle $\theta_i$, the value of the emission angle $\theta_i$ depends on a degree of deflection of the scanning mirror 50 to the first parallel light L2, that is, the scanning mirror 50 can emit the deflected light Ld at different size of the emission angle $\theta_i$. The deflected light Ld deflects to the second parallel light L3 after incidents on the telecentric lens 70, that is, the deflected light Ld emits from the scanning mirror 50 at different emission angle $\theta_i$ is all deflected to the second parallel light L3 parallel to the optical axis O of the telecentric lens 70. The difference is that the deflected light Ld emitting from the scanning mirror 50 at different emission angle $\theta_i$ has a different distance from the optical axis O of the telecentric lens 70 when emitting from the telecentric lens 70. When the emission angle $\theta_i$ is zero, the second parallel light L3 coincides with the optical axis O of the telecentric lens 70. The larger the emission angle $\theta_i$ is, the larger the distance between the second parallel light L3 emitting from the telecentric lens 70 and the optical axis O of the telecentric lens 70. The second parallel light L3 becomes the scanning light L4 by passing through the negative lens 90 at an emission angle $\theta_0$.

By setting the scanning mirror 50, the first parallel light L2 can be deflected into the deflected light Ld emitted sequentially at the different emission angle $\theta_i$. By setting the telecentric lens 70, the deflected light Ld at different emission angle $\theta_i$ can be deflected into the second parallel light L3 parallel to the optical axis O of the telecentric lens 70, so that a beam energy and a beam cross-section size of the second parallel light L3 converted from the deflected light Ld at larger emission angle $\theta_i$ are the same as the beam energy and the beam cross-section size of the second parallel light L3 converted from the deflected light Ld at smaller emission angle $\theta_i$. Then, when the second parallel light L3 is deflected by the negative lens 90 to the scanning light L4, a beam quality of the scanning light L4 with larger emission angle $\theta_0$ can be improved. By setting the telecentric lens 70 with the negative lens 90 to emit the scanning light L4, the emission angle $\theta_0$ of the scanning light L4 can bypass a structural limitation of the scanning mirror 50 itself, and the emission angle $\theta_0$ of the scanning light L4 is larger than the emission angle $\theta_i$ of the deflected light Ld, thus further expanding the scanning range of the laser scanning device 100.

In this embodiment, the laser device 10 is a vertical-cavity surface-emitting laser (VCSEL), the source light L1 emitted from the VCSEL laser device 10 is approximately a point light source and is emitted outward at a certain divergence angle.

Figure 3:
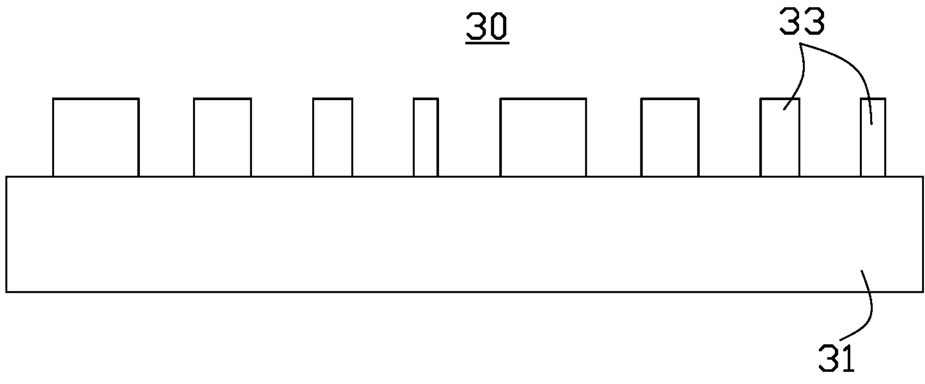
FIG. 3 is a schematic view of a collimating lens according to an embodiment of the present disclosure.

FIG. 3 illustrates a structure of the collimating lens 30 according to the first embodiment of the present disclosure. The collimating lens 30 is a metalens, including a transparent substrate 31 and a plurality of nanostructures 33 arranged on the transparent substrate 31 for deflecting a transmission direction of the source light L1. The nanostructures 33 is a plurality of densely arranged nanoscale columnar structures arranged on the transparent substrate 31. By setting a size and an arrangement of the plurality of nano structures 33, a light can be deflected to different degrees when passing through the combination of transparent substrate 31 and nanostructure 33, so as to achieve the focusing effect. The specific principle is that by setting nanostructures 33 of different sizes, the light path difference after passing through different nanostructures 33 is different, so that a phase of the light emitted is different from a phase of the light incident. By adjusting a wavefront of the light incident at different positions, the transmission direction of the light emitted can be changed compared with the transmission direction of the light incident.

In this embodiment, the plurality of the nanostructures 33 are configured to deflect the source light L1 emitted from the laser device 10 to the first parallel light L2 parallel to the optical axis of the collimating lens 30. In other embodiments, the arrangement of the plurality of nanostructures 33 can also be set as required.

In this embodiment, a focal length of the collimating lens 30 is 2 mm. Specifically, by setting the collimating lens 30 as a metalens formed by the combination of the transparent substrate 31 and the nanostructure 33, the focal length of the collimating lens 30 depends on the size and arrangement of the plurality of nanostructures 33. Therefore, compared with a typical lens, it is easier to achieve a shorter focal length, so that the optical path is more compact, and thus improve space utilization of the laser scanning device 100.

In this embodiment, the collimating lens 30 is also used to adjust an aberration of the first parallel light L2. Specifically, when collimating the source light L1, a typical lens under the influence of off-axis aberrations (such as coma, astigmatism and field curvature) will affect the energy distribution of the beam of the first parallel light L2 after collimation, thus affecting the scanning effect, so the typical lens usually needs to be attached to the lens surface optimization, resulting in an increase in cost and volume. By setting the collimating lens 30 as a metalens, the aberration of the first parallel light L2 can be adjusted by adjusting the arrangement of the nanostructures 33, thus eliminating the effect of aberration.

By setting the collimating lens 30 as a metalens and stacking the laser device 10 with the collimating lens 30, it is beneficial to improve the volume utilization, shorten the optical path, and reduce the difficulty of optical path design, thus reducing the cost of the laser device 100.

Figure 4:
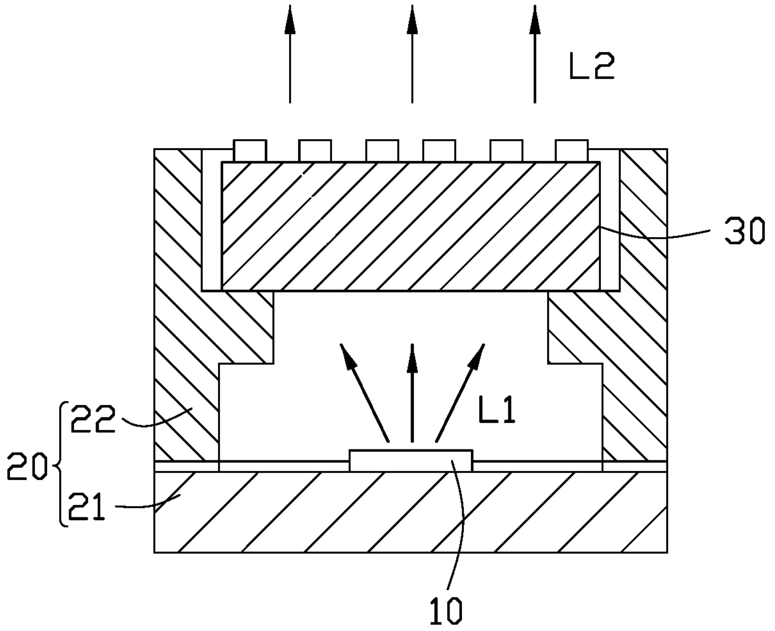
FIG. 4 is a schematic view of a package structure of a laser device and a collimating lens according to an embodiment of the present disclosure.

FIG. 4 illustrates a package structure of the laser device 10 and the collimating lens 30. Specifically, the laser device 10 and the collimating lens 30 are fixed and packaged by a package structure 20. The package structure 20 includes a package substrate 21 and a package wall 22. The laser device 10 is arranged on the package substrate 21, and the package wall 22 is a fixed structure formed by successively stacking on the package substrate 21 for fixing the collimating lens 30. By stacking the laser device 10 and the collimating lens 30, a compact integrated structure can be formed between the laser device 10 and the collimating lens 30, thereby improving a space utilization rate and reducing the difficulty of optical path setting.

Figure 5:
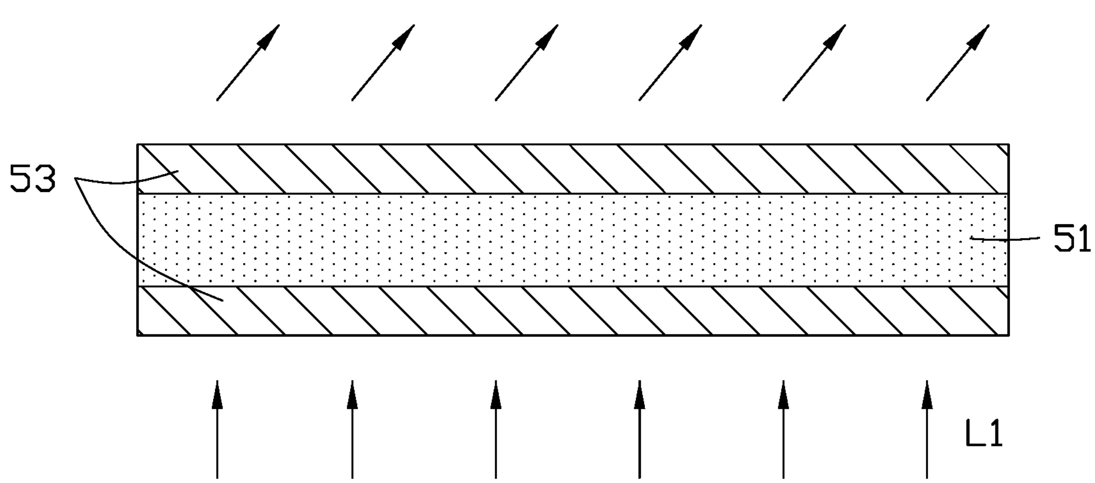
FIG. 5 is a schematic view of a scanning mirror according to an embodiment of the present disclosure.

FIG. 5 illustrates the structure of the scanning mirror 50. In this embodiment, the scanning mirror 50 is stationary with respect to the collimating lens 30, and the scanning mirror 50 includes a steering layer 51 and a control device 53. The control device 53 is configured to change the direction of transmission of the first parallel light L2 incident on steering layer 51. For example, the scanning mirror 50 is a liquid crystal module (LCM), the steering layer 51 includes a plurality of liquid crystal molecules (not shown in the figure), the first parallel light L2 passes through the steering layer 51 and emits the deflection light Ld, and the control device 53 is used to control the deflection of the liquid crystal molecules, thus deflects the first parallel light L2 passing through the steering layer 51. The control device 53 includes a pair of control electrodes arranged on both sides of the steering layer 51 and a corresponding control circuits. By controlling a voltage difference generated on both sides of the steering layer 51, a degree of deflection of the liquid crystal molecules can be controlled, and then the deflection angle of the deflected light Ld can be changed.

In another embodiment, the scanning mirror 50 may also be a liquid crystal on silicon (LCOS) structure. The steering layer 51 is used to reflect the first parallel light L2, and the control device 53 is used to control the reflection angle of the steering layer 51 to the first parallel light L2.

In other embodiments, the scanning mirror 50 may also be other optical devices with respect to the collimating lens.

In this embodiment, the laser device 10, the collimating lens 30 and the scanning mirror 50 are sequentially stacked and packaged. Specifically, the scanning mirror 50 is stationary relative to the collimating lens 30, so it can be packaged together with the laser device 10 and the collimating lens 30, further improving space utilization while reducing the difficulty of optical path setup, which helps to reduce manufacturing costs.

In other embodiments, the scanning mirror 50 includes a reflector for reflecting the first parallel light L2 and a deflection device (not shown) for controlling an angle between the reflector and the first parallel light L2 for controlling the emission angle $\theta_i$ of the deflected light Ld when being emitted from the scanning mirror 50. For example, the scanner 50 can be used for micro electro mechanical systems (MEMS), voice coil motor (VCM) or piezoelectric ceramics (PZT) and other devices composed of a movable mirror.

In this embodiment, the telecentric lens 70 can includes a plurality of lenses. By combining the lenses to form a telecentric optical path, the deflection light Ld incident at different incidence angle are all deflected to the second parallel light L3 parallel to the optical axis O of the telecentric lens 70. The beams of different second parallel light L3 at different positions of the optical axis O of the telecentric lens 70 have a same energy distribution and beam cross section size. Specifically, as FIG. 2 shows, if the first parallel light L2 is deflected by the scanning mirror 50, and directly incident on a scanning plane P, a shape of a spot formed on the scanning plane P changes with the change of the emission angle $\theta_i$. If the shape of the spot is a circular when the emission angle $\theta_i$ is zero, the shape of the spot will gradually elongate into an ellipse with an increase of the emission angle $\theta_i$, and a long axis of the elliptical spot will gradually increase, resulting in serious deformation of the spot at an edge position of the scanning plane P and affecting the scanning effect. By setting the telecentric lens 70, the deflection light Ld corresponding to the edge position can be first converted into the second parallel light L3 with the same beam cross-section as the deflection light Ld at a middle position, and then emitted through the negative lens 90. At this time, the shape of the light spot formed on the scanning plane P will not be affected by the emission angle $\theta_i$, thus improving the scanning accuracy.

In this embodiment, the negative lens 90 is configured to deflect the second parallel light L3 to the scanning light L4, thus achieving a certain range of scanning. Specifically, as FIG. 1 and FIG. 2 show, the negative lens 90 is set coaxial with the telecentric lens 70, the second parallel light L3 passing through the center of negative lens 90 along the optical axis does not change the direction of transmission, and the second parallel light L3 with a certain distance from the optical axis is deflected, emitting at an emission angle $\theta_0$.

In this embodiment, a focal length $f_0$ of the negative lens 90 is less than a focal length $f_i$ of the telecentric lens 70. Specifically, the emission angle $\theta_0$ of the scanning light L4 is related to the emission angle $\theta_i$ of the deflected light Ld from the scanning lens 50, the focal length $f_0$ of the negative lens 90, and the focal length $f_i$ of the telecentric lens 70. The emission angle $\theta_0$ can be expressed as:

$$\theta_0=\arctan(f_i*\tan\theta_i/f_0).$$

As the equation shows, when the focal length $f_0$ of the negative lens 90 is less than the focal length $f_i$ of the telecentric lens 70, the emission angle $\theta_0$ of the scanning light L4 is larger than the emission angle $\theta_i$ of the deflecting light Ld from the scanning lens 50. That is, a scanning range of the scanning light L4 is greater than a deflection range of the scanning mirror 50 on the deflecting light Ld. Thus, the scanning range of the laser scanning device 100 is expanded.

In other embodiments, the focal length $f_0$ of the negative lens 90 can also be equal to the focal length $f_i$ of the telecentric lens 70, such that the range of the scanning light L4 is equal to the deflection range of the scanning lens 50 on the deflected light Ld, and the scanning light L4 emitted after the telecentric lens 70 and negative lens 90 can still optimize the light in the distal axis relative to the deflected light Ld.

By setting the collimating lens 30, the telecentric lens 70, and the negative lens 90, the scanning light L4 with a larger emission angle $\theta_0$ can be optimized. By setting the collimating lens 30, it is beneficial to optimize the aberration of the first parallel light L2 after collimation, and make the beam energy distribution of the first parallel light L2 uniform. By setting the telecentric lens 70, it is beneficial to deflect the deflected light Ld emitted at different emission angles to the second parallel light L3 parallel to the optical axis O of the telecentric lens 70, so that the multiple beams of the second parallel light L3 after deflection have the same beam energy and beam cross section size. By setting the negative lens 90, the second parallel light L3 at different positions is deflected into a scanning light L4, so that the scanning light L4 irradiated on the scanning plane P has the same spot shape and energy distribution, thus improving the accuracy of scanning.

Figure 6:
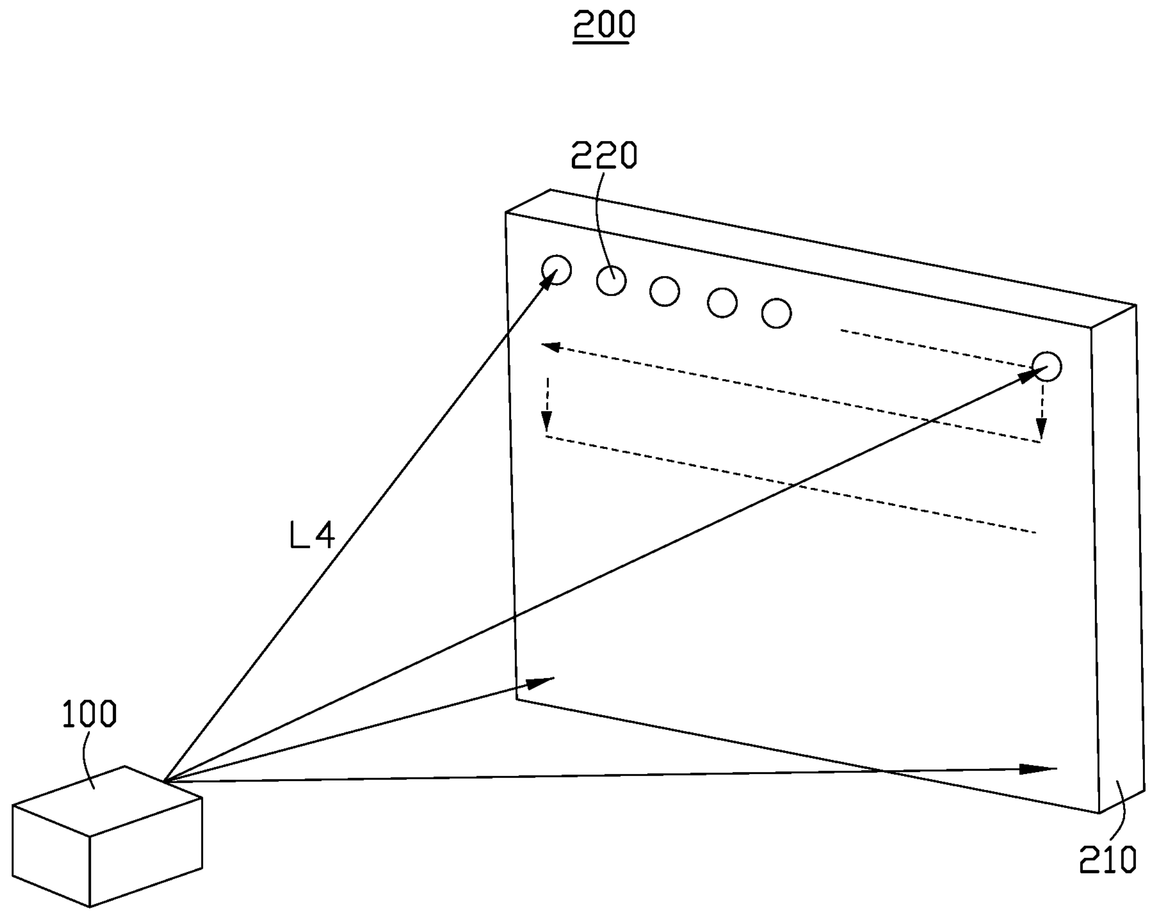
FIG. 6 is a schematic view of a projecting system according to an embodiment of the present disclosure.

FIG. 6 illustrates a projecting system 200 according to a second embodiment of the present disclosure. The projecting system 200 includes the laser scanning device 100 in the first embodiment, and a modulation chip electrically connecting with the laser device 10 and the scanning mirror 50 for modulating a plurality of beams of the scanning light L4 emitted within a frame time into an image light. Specifically, the laser device 10 emits lasers with different colors and brightness, and the modulation chip controls the scanning mirror 50 to project the lasers of different colors and brightness to different positions successively according to the image content to be displayed, thus forming an image.

In this embodiment, the projecting system 200 also includes an imaging medium 210. The imaging medium 210 is configured to receive the scanning light L4, and the plurality of beams of the scanning light L4 emitted within a frame time form an image on the imaging medium. Specifically, the laser scanning device 100 forms a plurality of spots 220 on the imaging medium 210, each of the spots 220 has one color and brightness. The spots 220 forms the image within a frame time, so that the imaging medium 210 can display an image or a video.

Figure 7:
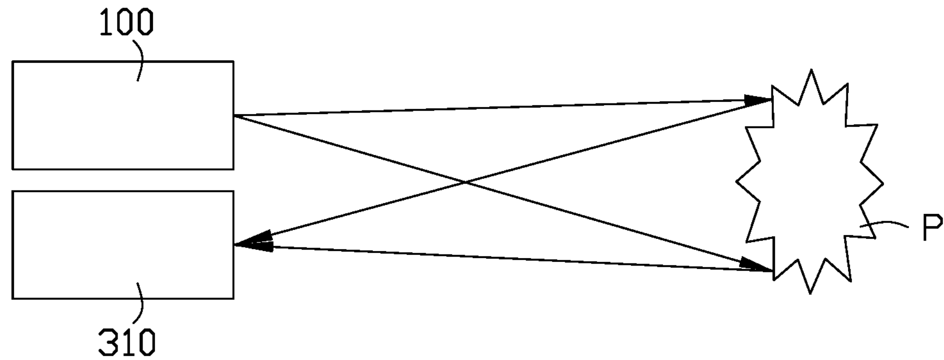
FIG. 7 is a schematic view of a time-of-flight device according to an embodiment of the present disclosure.

FIG. 7 illustrates a ToF device 300 according to a third embodiment of the present disclosure. The ToF device 300 includes the laser scanning device 100 in the first embodiment, and a receiving module 310. The receiving module 310 is configured to receive the scanning light L4 reflected back after being illuminated to an external object P.

In this embodiment, the ToF device 300 further includes a processor electrically connecting to the laser scanning device 100 and the receiving module 310, the processor is configured for calculating a distance between the external object P and the ToF device 300. Specifically, the processor can calculate the flighting time of the scanning laser L4 from the ToF device 300 to the external object P, and then calculate the distance between the external object P and the ToF device 300. By controlling the emission angle of the scanning light L4, the ToF device 300 can also produce a depth image of the external object P.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. A laser scanning device comprising:
- a laser device emitting source light;
- a collimating lens configured for receiving the source light and converting the source light into parallel light to emit a first parallel light;
- a scanning mirror configured for receiving the first parallel light and changing a transmission direction of the first parallel light to emit a deflection light;
- a telecentric lens configured for receiving the deflection light and converting the deflection light into a second parallel light which is parallel to an optical axis of the telecentric lens; and
- a negative lens configured for receiving the second parallel light and changing a transmission direction of the second parallel light to emit a scanning light, and a focal length of the negative lens is less than a focal length of the telecentric lens.

2. The laser scanning device of claim 1, wherein the collimating lens is a metalens and comprises a transparent substrate and a plurality of nanostructures arranged on the transparent substrate, the plurality of nanostructures deflects a transmission direction of the source light.

3. The laser scanning device of claim 2, wherein a focal length of the collimating lens is less than 2 mm.

4. The laser scanning device of claim 2, wherein the collimating lens is further configured for adjusting an aberration of the first parallel light.

5. The laser scanning device of claim 2, wherein the laser device and the collimating lens are laminated and encapsulated.

6. The laser scanning device of claim 1, wherein the scanning mirror comprises a reflector and a deflection device, the reflector is configured for reflecting the first parallel light, and the deflection device is configured for adjusting an angle between the reflector and the first parallel light.

7. The laser scanning device of claim 1, wherein the scanning mirror is stationary with respect to the collimating lens, and the scanning mirror comprises a steering layer and a control device for changing a transmission direction of the first parallel light emitting on the steering layer.

8. The laser scanning device of claim 7, wherein the steering layer comprises a plurality of liquid crystal molecules, the steering layer transmits the first parallel light, and the control device controls a deflection of the plurality of liquid crystal molecules to change the transmission direction of the first parallel light exiting the steering layer.

9. The laser scanning device of claim 7, wherein the laser device, the collimating lens, and the scanning mirror are successively laminated and encapsulated.

10. A projecting system comprising:
- a laser scanning device comprising:
- a laser device emitting a source light;
- a collimating lens configured for receiving the source light and converting the source light into parallel light to emit a first parallel light;
- a scanning mirror configured for receiving the first parallel light and changing a transmission direction of the first parallel light to emit a deflection light;
- a telecentric lens configured for receiving the deflection light and converting the deflection light incident into a second parallel light which is parallel to an optical axis of the telecentric lens; and
- a negative lens configured for receiving the second parallel light and changing a transmission direction of the second parallel light to emit a scanning light, and a focal length of the negative lens is less than a focal length of the telecentric lens; and
- a modulation chip electrically connecting with the laser device and the scanning mirror for modulating a plurality of beams of the scanning light emitted within a frame time into an image light.

11. The projecting system of claim 10, wherein the collimating lens is a metalens and comprises a transparent substrate and a plurality of nanostructures arranged on the transparent substrate, the plurality of nanostructures deflects a transmission direction of the source light, and a focal length of the collimating lens is less than 2 mm.

12. The projecting system of claim 10, wherein the collimating lens is further configured for adjusting an aberration of the first parallel light.

13. The projecting system of claim 10, further comprising an imaging medium configured for receiving the scanning light, and beams of the scanning light emitted to the imaging medium within a frame time form an image on the imaging medium.

14. A time-of-flight (ToF) device comprising:
- a laser scanning device comprising:
- a laser device emitting a source light;
- a collimating lens configured for receiving the source light and converting the source light into parallel light to emit a first parallel light;
- a scanning mirror configured for receiving the first parallel light and changing a transmission direction of the first parallel light to emit a deflection light;
- a telecentric lens configured for receiving the deflection light and converting the deflection light into a second parallel light which is parallel to an optical axis of the telecentric lens; and
- a negative lens configured for receiving the second parallel light and changing a transmission direction of the second parallel light to emit a scanning light, and a focal length of the negative lens is less than a focal length of the telecentric lens; and
- a receiving module configured for receiving the scanning light reflected back after being illuminated to an external object.

15. The ToF device of claim 14, wherein the collimating lens is a metalens and comprises a transparent substrate and a plurality of nanostructures arranged on the transparent substrate, the plurality of nanostructures deflects a transmission direction of the source light, and a focal length of the collimating lens is less than 2 mm.

16. The ToF device of claim 14, wherein the collimating lens is further configured for adjusting an aberration of the first parallel light.

17. The ToF device of claim 14, further comprising a processor electrically connecting to the laser scanning device and the receiving module, the processor is configured for calculating a distance between an external object and the ToF device.

* * * * *